US005640792A

United States Patent [19]
Smith et al.

[11] Patent Number: 5,640,792
[45] Date of Patent: Jun. 24, 1997

[54] LIGHTING FIXTURES

[75] Inventors: Stephen T. Smith, Conyers; Donald C. O'Shea, Atlanta, both of Ga.

[73] Assignee: National Service Industries, Inc., Atlanta, Ga.

[21] Appl. No.: 471,820

[22] Filed: Jun. 7, 1995

[51] Int. Cl.⁶ ..................................................... G09F 13/18
[52] U.S. Cl. .............................. 40/546; 40/570; 40/581; 362/31; 362/293; 362/800
[58] Field of Search ........................... 40/546, 570, 581; 362/31, 293, 800, 812

[56] References Cited

U.S. PATENT DOCUMENTS

| 3,591,941 | 7/1971 | Jaffe, Jr. | 40/570 X |
| 4,385,343 | 5/1983 | Plumly | 40/570 X |
| 5,020,252 | 6/1991 | De Boef | 40/564 |
| 5,251,392 | 10/1993 | McManigal | 40/546 X |
| 5,276,591 | 1/1994 | Hegarty | 362/31 |
| 5,365,411 | 11/1994 | Rycroft et al. | 40/546 X |

OTHER PUBLICATIONS

Weber, Ernest, Chapter 15 of Part 11 (Eshbach, Standard Book of Engineering Fundamentals, 1975). Vision, "Physiology of Radiation", pp. 1077–1084.

Werner, Ken, Higher Visibility for LEDs, "Advanced Technology/Display," IEEE *Spectrum*, Jul., 1994, pp. 30–34, 39.

NICHIA LED Blue Light Emitting Diode, NICHIA Chemical Industries, Ltd. publication, (4 pages), dated Mar. 15, 1995.

Kingbright T-1¾ (5mm) Super Bright LED Lamps specifications, pp. 1–223 through 1–225.

LEDs . . . The Efficient Answer to Power–Hungry Incandescent Traffic Signals, Electro–Tech, Anaheim, CA (3 pages).

Hamilton, David P., Japanese Lighting Researcher Hopes to Turn LED Into Gold, "Wall Street Journal", May 10, 1995 (2 pages).

*Primary Examiner*—Brian K. Green
*Attorney, Agent, or Firm*—James L. Ewing, IV; Kilpatrick Stockton LLP

[57] ABSTRACT

Lighting fixtures which feature indicia illuminated more uniformly and with greater brightness than in conventional lighting fixtures. LEDs which operate at a higher frequency/shorter wavelength, such as blue LEDs, emit light which causes the transformation material to reemit, reradiate or emit light at a lower frequency/longer wavelength with increased brightness and uniformity. In a preferred embodiment of the lighting fixtures, blue LEDs cause the transformation material to emit green light for bright and even illumination of indicia such as letters and chevrons in exit signs, and at a wavelength to which the human eye is serendipitously sensitive.

20 Claims, 8 Drawing Sheets

SPECTRAL DISTRIBUTION OF RELATIVE HUMAN VISIBILITY

RELATIVE INTENSITY VS. WAVELENGTH

LIGHTING FIXTURES

This invention relates to lighting fixtures that employ LEDs to illuminate transformation material which, when excited by light from the LEDs, radiates light of wavelength in a different band than that received.

BACKGROUND OF THE INVENTION

Lighting fixtures such as emergency exit lighting fixtures have employed incandescent and/or flourescent illumination devices for many years. Although incandescent and flourescent bulbs are inexpensive, their service life is limited. Because of the fact that they emit essentially white light, however, they may be conveniently placed behind red or green translucent screens for bright and uniform illumination of indicia such as the word "exit" or the figure of a human in motion. The omnidirectional radiation characteristic of incandescent and flourescent devices also enhances bright and uniform illumination of the indicia. However, incandescent devices, and to a lesser extent, fluorescent devices, emit heat, suffer efficiency losses and require heavier power supplies and battery backups.

Light emitting diodes ("LEDs") have in recent times enjoyed greater use in lighting fixtures such as exit lighting primarily because of their longer service life. They also generally require lighter duty power supplies and battery backups. Maintenance costs are greatly reduced because LEDs last about a million hours before degrading to half power.

Although LEDs were first commercialized in the early 1960s, they then featured a luminous efficiency on the order of 0.15 lumen ("lm") per watt ("lm/W") as compared to 3.5 lm/W of a red filtered incandescent lamp. Not until the development of isoelectronically doped indirect semiconductors in the mid-1970s did diodes become brighter and more varied in color. Red, yellow, and green diodes so manufactured could produce a luminous efficiency in the range of 1 lm/W; single heterostructure diodes raised the efficiency to a range of 2 lm/W. Exit lighting use of LEDs increased dramatically, however, after 1989, when double-heterostructure diodes began to exceed the luminous efficiency of red filtered incandescent lamps.

Although such red LEDs have been used in braking lights mounted in the center of automobile rear windows (so called center high-mounted stoplights or "CHMSL's"), the highly directional light pattern emitted by LEDs presents problems in exit lighting. Various approaches have been developed in an effort to diffuse LED light patterns in order to illuminate exit lighting indicia uniformly and to present sufficient brightness. Interior portions of the exit lighting housing have been coated with reflective material, various lighting baffles and reflective surfaces have been provided, and the LEDs have been located within miniature luminaires in an effort to diffuse the lighting sufficiently to illuminate the exit lighting indicia in an acceptable fashion.

One recently developed approach to this problem has been the use of red or green LED's and red or green screens, respectively, to scatter light in a relatively diffuse, more omnidirectional manner. Accordingly, exit lighting manufacturers have employed banks of LEDs, among other structures, behind red screens of materials that are employed to diffuse the light, which screens may in turn be located behind stencils in the exit lighting faceplates forming the indicia to create a bright and evenly illuminated message. Although some of these diffusing materials could also function in a transformational manner as defined below to absorb light in a first frequency band and reemit at a second if the proper sorts of LED's had been employed, to the inventors' knowledge red LED's have been used only with red screens and green LED's with green screens so that only the diffusing properties of such materials are exploited.

The green LED exit lighting fixtures have generally enjoyed less success than the reds. Efforts to position green emitting LEDs behind green screens result in dim, if evenly lighted, indicia. Green LEDs behind green diffusing screens which are simply translucent and do not employ transformation material feature hot spots in which individual LEDs may be discerned as they form dots on the indicia. The tradeoff between hot spots and dimness has plagued the green exit lighting field.

SUMMARY OF THE INVENTION

The inventors have found that excitation of transformation material with light of a shorter wavelength (higher frequency) than that of the color desired to be produced by the transformation material creates transformation material emission of increased luminosity and brightness in the desired portion of the spectrum. They have found that this effect works particularly well when green transformation material is illuminated with blue light. (For purposed of this document, "brightness" is considered to be a subjective attribute of light that may be described as varying over a range from very dim to blinding and corresponds generally (albeit in a nonlinear fashion) to luminance, all other factors remaining constant. "Luminance" is simply the luminous flux (typically measured in lumens) per unit area projected in a given direction (the SI unit for which is the candela per square meter). "Luminous efficiency" is the ratio, measured in lumens per watt, of luminous flux to the electric power that produced it.)

The recent advent of reasonably efficient blue diodes causes this observation to be of greater import. Until recently, blue diodes were made from silicon carbide and suffered very low luminous efficiency in the range of 0.04 lm/W. Recently, however blue LEDs have marketed made from zinc-doped indium gallium nitride and aluminum gallium nitride. These new blue LEDs enjoy a luminous intensity of 1000 millicandelas, approximately 100 times greater than previously existing blue LEDs (even if only half that of recently available red and yellow LEDs and only 1/18th of the new bright orange double heterostructure LEDs.) According to the present invention, blue LEDs may be located in place of incandescent or flourescent bulbs in green exit signs and combines with conventional green transformation material to produce bright, evenly illuminated indicia for the first time. Just as easily, other transformation materials may be exploited, so that, for instance, it may be possible to use a red transformation material which absorbs light in the orange band, or other transformation materials which absorb light in a higher frequency band and reemit, reradiate or emit in a lower frequency band.

It is accordingly an object of the present invention to provide lighting fixture featuring indicia which emit light in a first frequency band and reemit, reradiate or emit light in a second frequency band.

It is an additional object of the present invention to provide lighting fixtures featuring green indicia which are bright and evenly illuminated.

It is an additional object of the present invention to provide lighting fixtures with green indicia illuminated by blue LEDs, which enjoy lower maintenance requirements and power requirements than conventional incandescent or flourescent devices.

It is additional object of the present invention to provide lighting fixtures with green indicia illuminated by blue LEDs for brightness which exceeds such fixtures illuminated with green LEDs.

Other objects, features and advantages of the present invention will become apparent with reference to the remainder of this document.

DETAILED DESCRIPTION OF THE DRAWINGS

Figure 1:
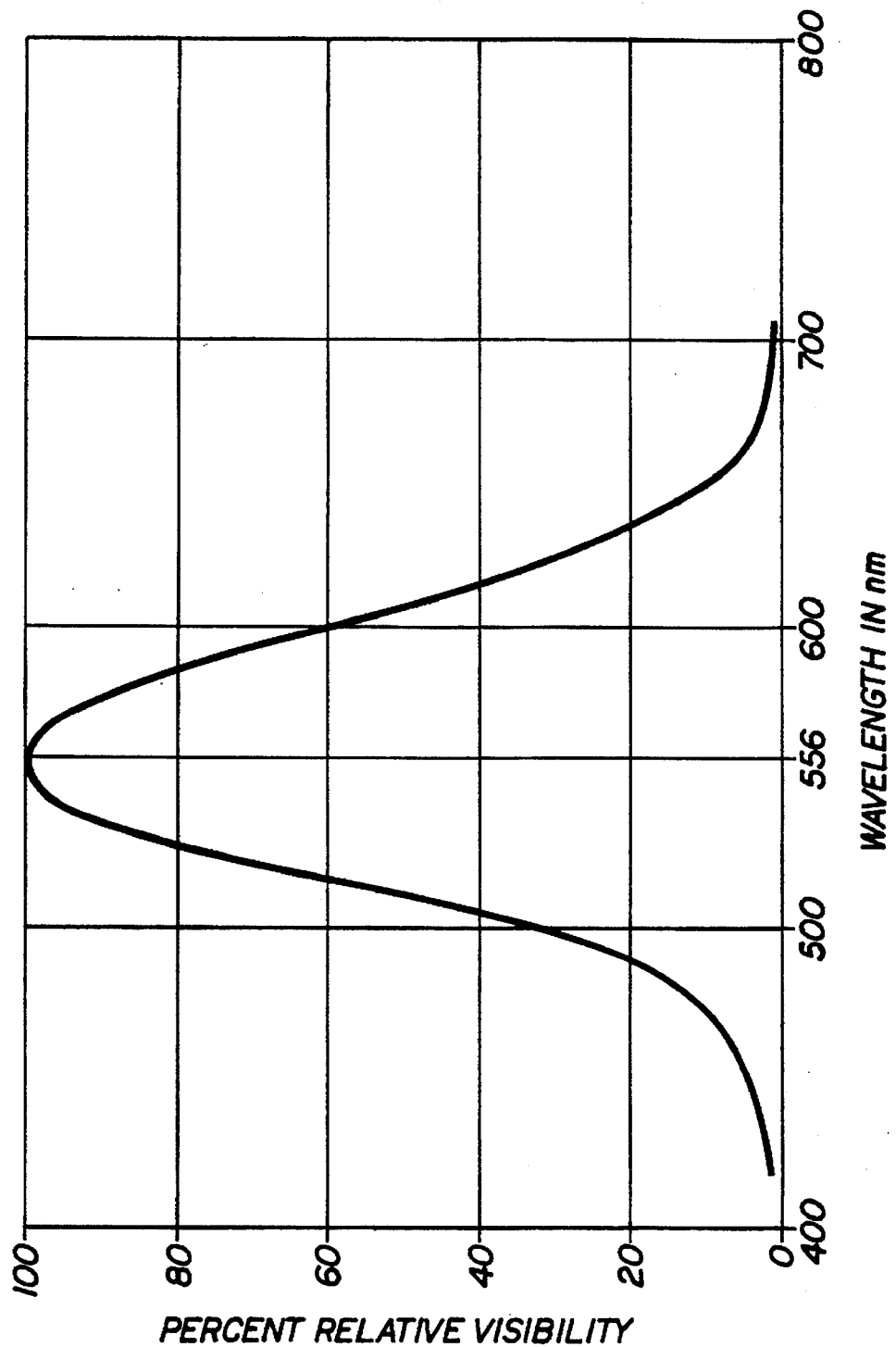
FIG. 1 is a diagram showing the spectral distribution of light to which the human eye is sensitive.

FIG. 1 is a diagram which shows the spectral distribution of light to which the human eye is sensitive. The peak wavelength of yellow-green light to which the human eye is most sensitive is 556 nanometers ("nm") at which 1 watt of radiant power equals a luminous flux of approximately 680 lm. The eye's sensitivity falls off sharply; at 510 and 610 nm, 1 watt is equivalent to only approximately 340 lumens.

It is likely for this reason, primarily among others, that lighting fixtures such as exit lighting, sometimes employ green indicia rather than red, in the same manner that fire engines have been painted yellow-green in some communities around the country.

The inventors and others have conventionally employed green screens in combination with green LEDs to illuminate indicia in such fixtures. The inventors have found that when the LEDs are, for instance, pointed toward the reverse of the housing, which is coated with reflective material in order to diffuse the concentrated lighting patterns of the LEDs, luminous efficiency and brightness suffers as light energy is dissipated within the housing. However, green LEDs combined simply with a green plastic screen of conventional manufacture behind the stencil of a lighting fixture faceplate produce hot spots which are unattractive and sometimes diminish the readability of the indicia. To overcome these problems, the inventors and others have conventionally employed such screens coated with a green diffusing ink which, when excited by light energy from the reverse side, scatters light in a relatively more diffuse, more omnidirectional manner for an even (albeit relatively dim) green appearance.

Figure 2A:
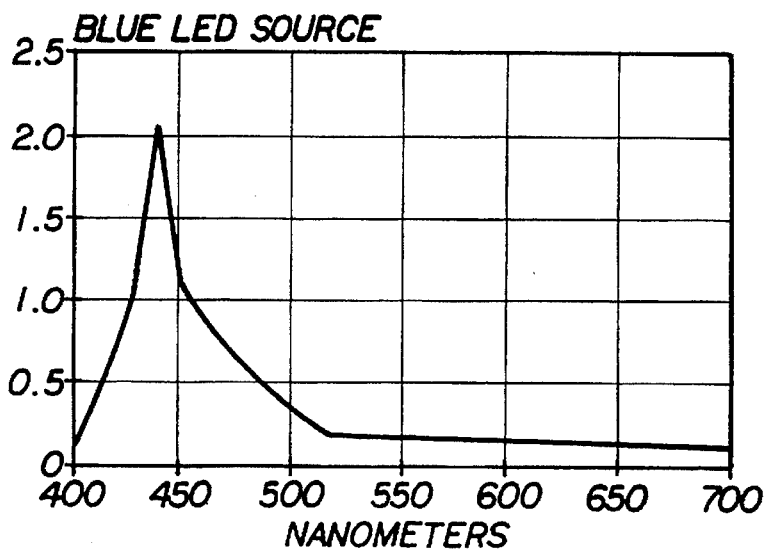
FIG. 2A is a curve showing the spectral distribution of a Blue LED source which is employed to illuminate green transformation material according to the present invention.
Figure 2B:
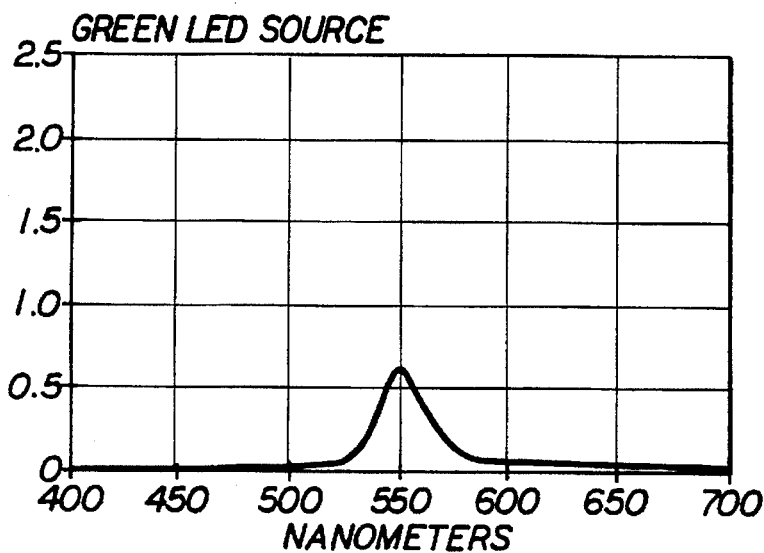
FIG. 2B is a curve showing the spectral distribution of a Green LED source which is employed to illuminate green diffusing material.
Figure 2C:
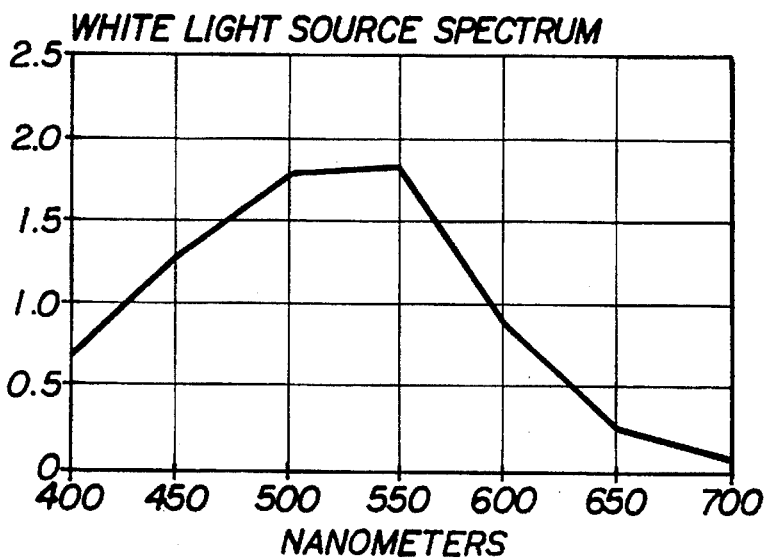
FIG. 2C is a curve showing the spectral distribution of a white light source (in this case, an incandescent projector bulb).
Figure 2D:
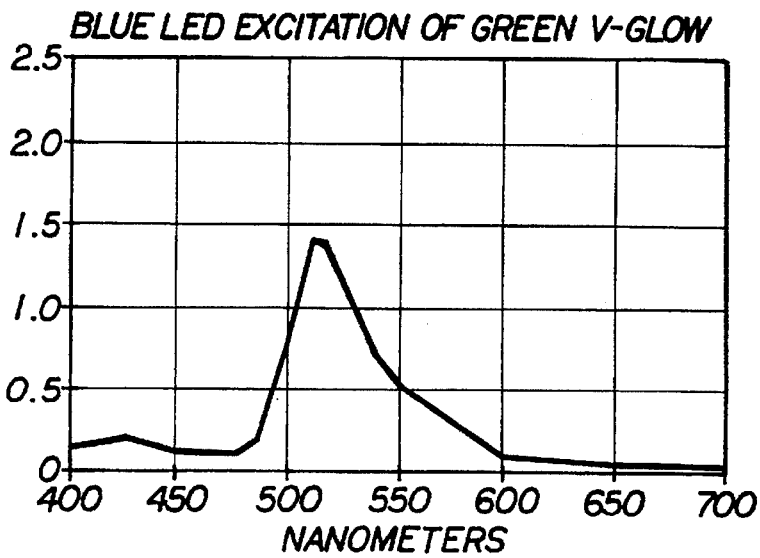
FIG. 2D is a curve showing the spectral distribution of green transformation material illuminated by Blue LED light according to the present invention.
Figure 2E:
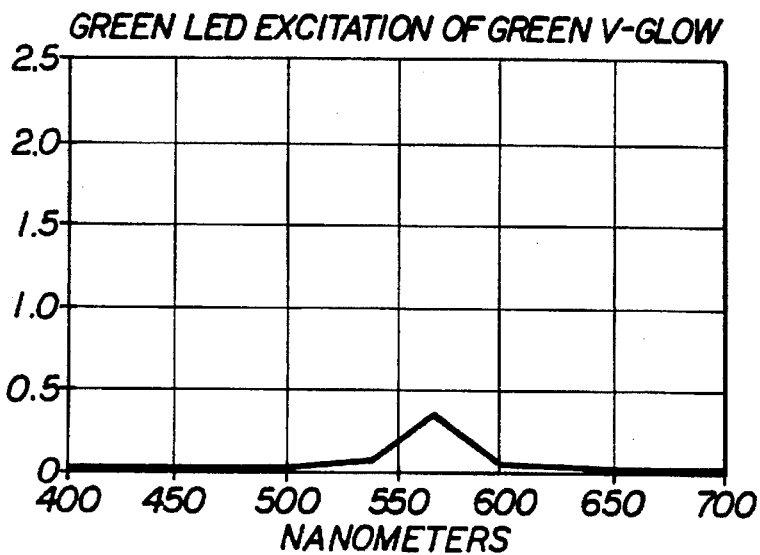
FIG. 2E is a curve showing the spectral distribution of green diffusing material illuminated by Green LED light.
Figure 2F:
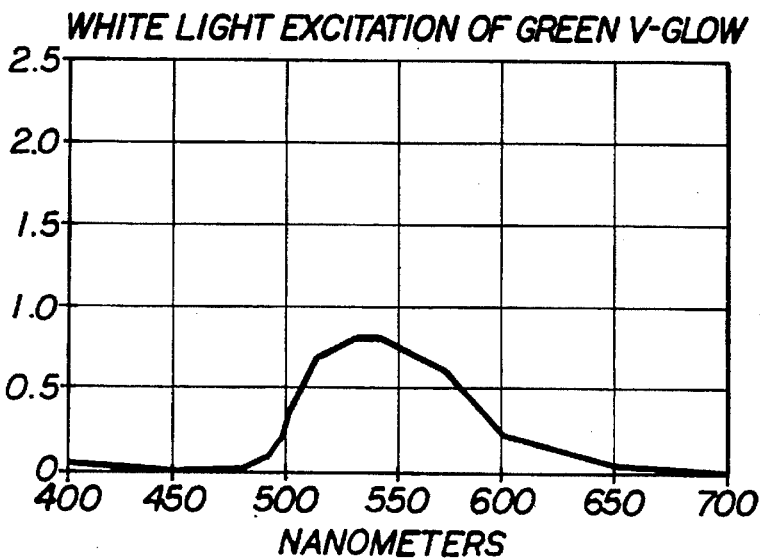
FIG. 2F is a curve showing the spectral distribution of green material illuminated by a white light source.
Figure 2G:
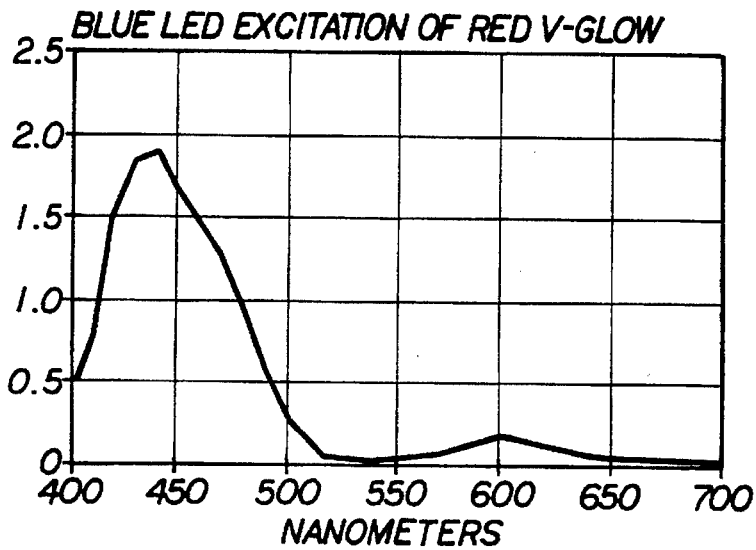
FIG. 2G is a curve showing the spectral distribution of red material illuminated by Blue LED light.
Figure 2H:
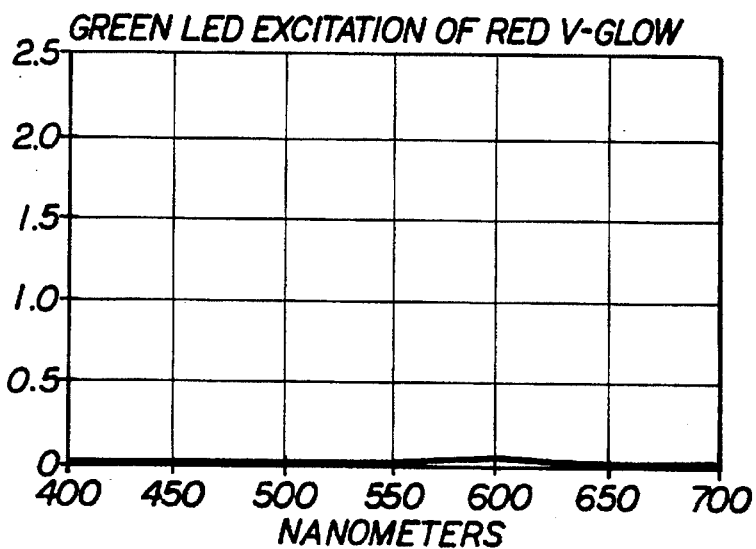
FIG. 2H is a curve showing the spectral distribution of red material illuminated by Green LED light.
Figure 2I:
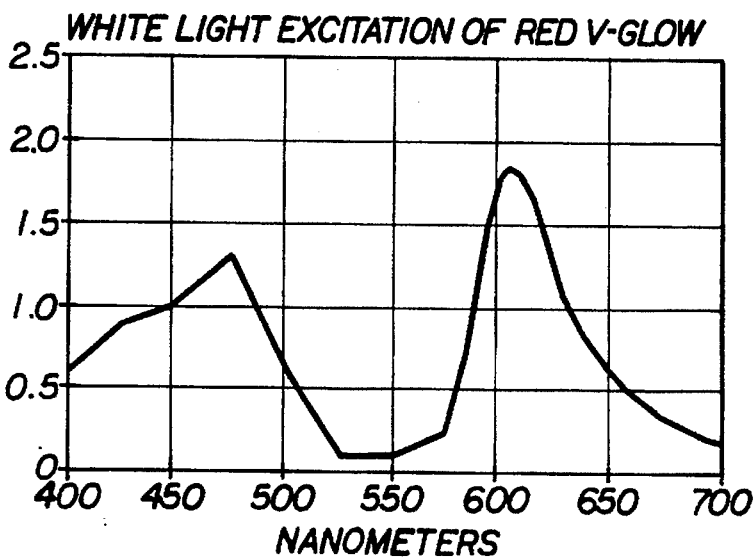
FIG. 2I is a curve showing the spectral distribution of red material illuminated by a white light source.
Figure 4:
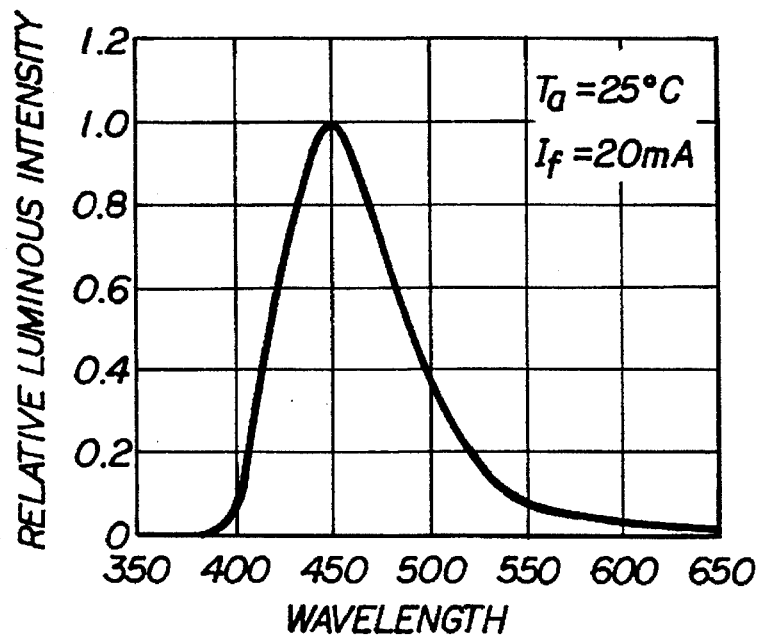
FIG. 4 is a diagram showing a luminous spectrum of a blue LED employed according to the present invention.
Figure 5:
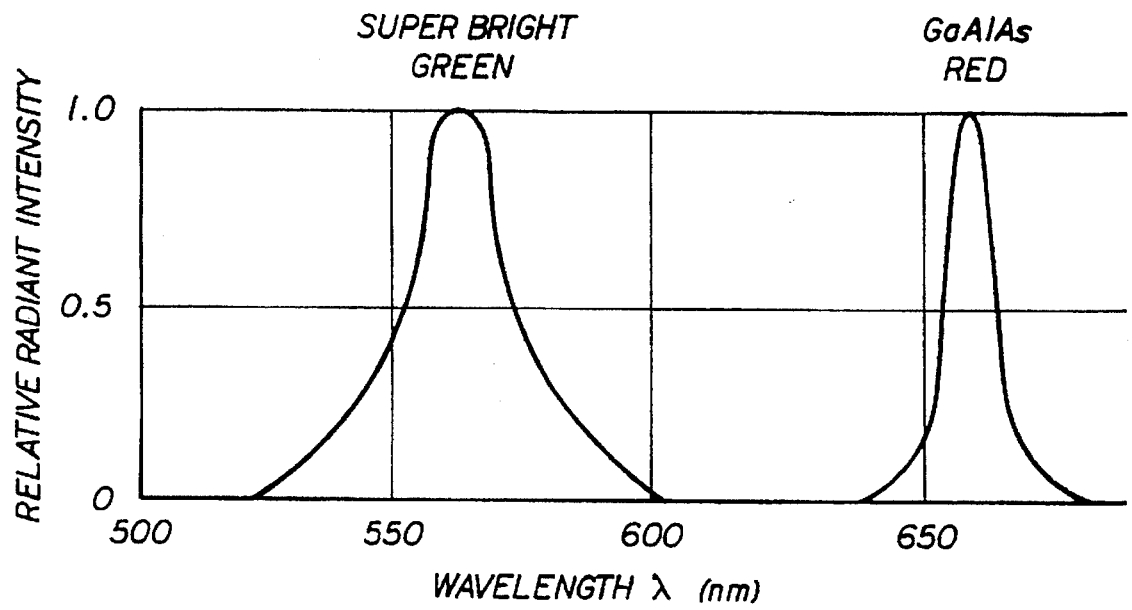
FIG. 5 is a diagram showing the luminous spectrum of a conventional super bright green LED employed in conventional lighting fixtures featuring green indicia.

The inventors have, however, found that inks and other materials employed conventionally as diffusing materials can appear brighter if they are illuminated with light in a higher frequency band than that at which they emit. (For purposes of this document, "transformation materials" means any materials which reradiate, reemit or emit light energy in a second band of frequency or wavelength upon receipt of light energy in a first band of frequency or wavelength, which bands may be partially or fully coextensive.) Thus, as shown in FIGS. 2A and 2D, transformation material according to the present invention radiates light of predominantly 490 to 550 nm wavelength (and substantially 500 to 520 nm peak wavelength) (predominantly green) when illuminated by light of predominantly 420 to 470 nm wavelength (and substantially 430 to 450 nm peak wavelength) (from Blue LED's). When illuminated by light from a standard white light source such as a projector incandescent bulb as shown in FIGS. 2C and 2F, such transformation material reemits or radiates light of substantially 530 nm peak wavelength. This transformation material, which has also been used conventionally in exit lighting as a diffusing material, is commercially known as "V-Glo," Part No. VG-590 supplied by Naz-Dar/KC, 1087 North Branch Street, Chicago, Ill. 60622. Accordingly, note in FIGS. 2B and 2E that when the material is illuminated with light from green LED's of substantially 550 to 570 nanometer peak wavelength, the resulting light is at the same peak wavelength but significantly weaker and thus has only been diffused but not transformed in accordance with the present invention. The inventors have found that use of blue LEDs to illuminate such transformation material greatly increases the brightness of the light radiated by the transformation material, relative to the brightness of the light radiated by the transformation material when driven by green LEDs or the conventional "super bright green" LEDs. Note also the narrow bandwidth of curve 2D against curve 2F. The luminous spectrum for such blue LEDs is shown in FIGS. 2A and 4 to peak at substantially 430 to 450 nm and to contain predominantly wavelengths of between substantially 420 and 470 nm. (By comparison, as shown in FIG. 5, the spectral distribution for a conventional "super bright green" LED peaks at approximately 562 nm and contains predominantly between approximately 555 and 580 nm.)

Blue LEDs according to the present invention may be those such as manufactured by Nichia Chemical Industries, Ltd. of Japan. One version that works well is known by Part No. "NLPB 510 having a lens diameter of 5 millimeters and a directivity of 30°, the spectral distribution for which is shown in FIG. 4. These LEDs contain gallium nitride compounds to achieve the desired blue lighting effect.

Figure 3:
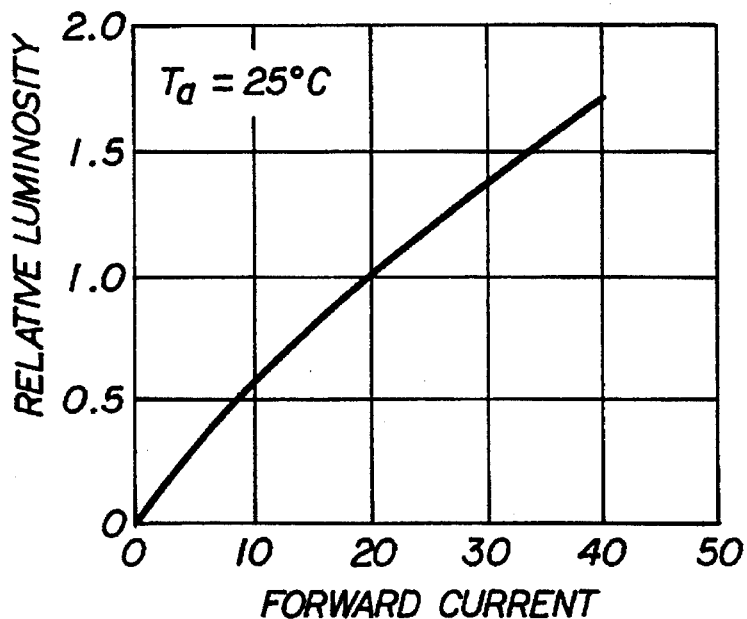
FIG. 3 is a diagram showing forward current against relative luminosity for a blue LED employed according to the present invention.
Figure 6:
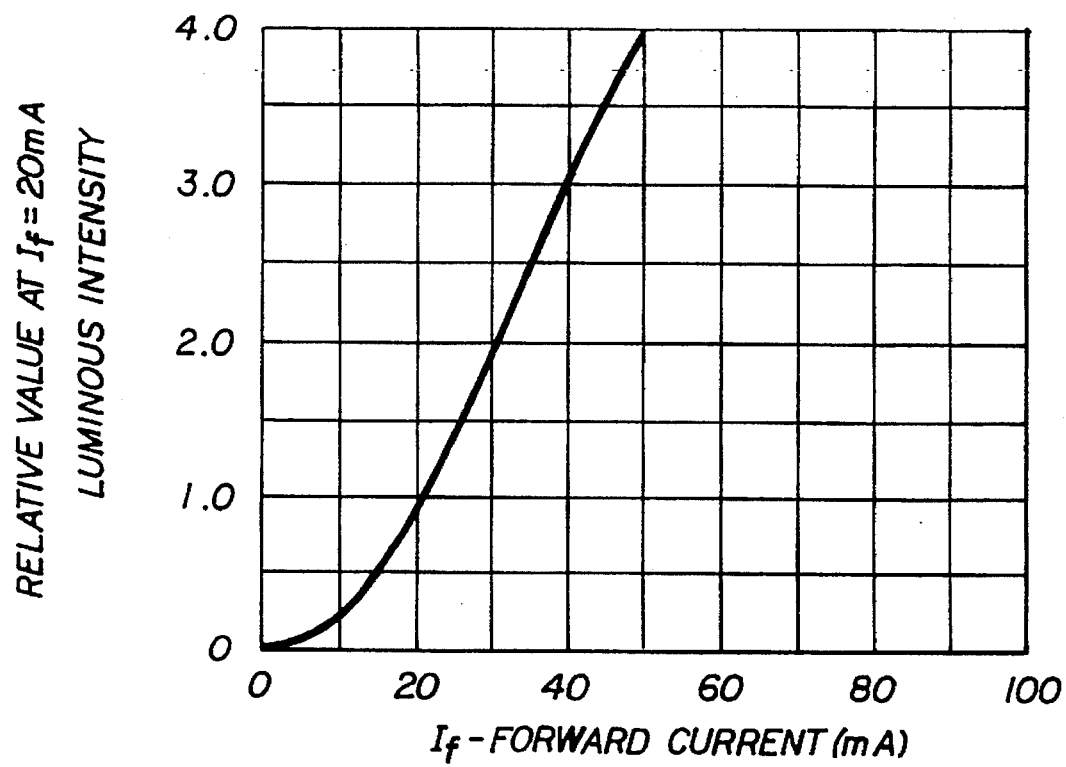
FIG. 6 is a diagram showing relative luminous intensity against forward current for such green LEDs.

The fact that the green transformation material mentioned above features increased brightness when illuminated with blue LEDs according to the present invention as opposed to green conventional LEDs, is counterintuitive when FIGS. 3 and 6 are considered. Those FIGS. show diagrams comparing relative luminosity against forward current in the blue LEDs and the green LEDs respectively. The curves show that although relative luminosity is approximately 1 at forward current of 20 milliamps for blue and green LEDs, curves are far more vertical for the green LEDs above 20 milliamps than for the blue LEDs. Accordingly, current of 40 milliamps produces luminosity of approximately 1.7 in the blue LEDs, while it produces a relative luminosity of approximately 3 in the green LEDs. Although this may suggest that increased brightness of the blue LED/green transformation material according to the present invention does not occur by virtue of increased luminous intensity from blue LEDs, it does suggest that the synergistic combination of the blue LEDs and the green transformation material creates the increased brightness.

Tables 1–4 bear out this phenomenon. They show contrast and luminance measurement visibility test sets of results based on measurements conducted per Underwriter Labs Standard 924, Luminance Measurement Visibility Test, paragraphs 32.12–32.19 (dated Nov. 30, 1990) which test is incorporated herein by this reference. Part numbers are shown on the tables, and are Lithonia Lighting part numbers unless otherwise stated. The Blue LEDs are tested at 25 mA, while the green LEDs are tested at 28 mA; note that 50 blue LEDs are employed for the test, while 80 green LEDs are employed. The tables contain four sets of results for combinations of blue or green LEDs and green panels coated (as described below) or not coated with the green V-Glo transformation material identified above contained in a Lithonia Lighting LQMSW1G 120/277 fixture connected to 120 VAC: (1) Fixture equipped with panel coated with green transformation material and 50 Nichia Part No. NLPB510 LEDs. (2) Fixture equipped with green molded panel (without transformation material) and 50 Nichia Part No. NLPB510 LEDs. (3) Fixture equipped with green panel coated with green transformation material as mentioned above and 80 EMEDA00025 LEDs supplied by Kingbright Corporation USA, 225 Brea Canyon Road, City of Industry, Calif. 91789. (4) Fixture equipped with green molded panel (without transformation material) and 80 EMEDA00025 LEDs.

TABLE 1

LUMINANCE DATA

| EXIT: | LQMSW1G 120/277 |
|---|---|
| HOUSING: | WHITE |
| PANEL: | GREEN V-Glo PANEL |
| # FACES: | 1 |
| LAMP #: | (50) BLUE LEDs NICHIA NCPB510 |

| | 5FC | AC |
|---|---|---|
| Letter "E" | | |
| 1 | 0.85 | 14.87 |
| 2 | 0.89 | 15.78 |
| 3 | 0.92 | 17.51 |
| 4 | 0.90 | 19.43 |
| 5 | 0.90 | 18.15 |
| 6 | 0.87 | 14.64 |
| 7 | 0.93 | 17.88 |
| 8 | 0.88 | 18.00 |

TABLE 1-continued

| | 5FC | AC |
|---|---|---|
| Letter "X" | | |
| 9 | 0.84 | 14.08 |
| 10 | 0.93 | 17.03 |
| 11 | 0.92 | 17.80 |
| 12 | 0.83 | 14.64 |
| 13 | 0.92 | 18.25 |
| Letter "T" | | |
| 14 | 0.79 | 15.29 |
| 15 | 0.89 | 18.29 |
| 16 | 0.90 | 17.05 |
| Letter "T" | | |
| 17 | 0.78 | 16.09 |
| 18 | 0.73 | 16.09 |
| 19 | 0.84 | 19.02 |
| 20 | 0.85 | 15.30 |
| Background | | |
| 4 | 4.33 | 0.14 |
| 9 | 3.95 | 0.14 |
| 14 | 3.69 | 0.14 |
| 19 | 3.62 | 0.14 |
| 1 | 4.27 | 0.13 |
| 6 | 4.09 | 0.17 |
| 11 | 3.72 | 0.19 |
| 16 | 3.61 | 0.19 |
| 21 | 3.54 | 0.13 |
| 2 | 4.23 | 0.14 |
| 7 | 4.14 | 0.15 |
| 12 | 3.91 | 0.16 |
| 17 | 3.87 | 0.15 |
| 22 | 3.76 | 0.15 |
| 3 | 4.04 | 0.14 |
| 8 | 4.15 | 0.15 |
| 13 | 4.12 | 0.15 |
| 18 | 4.17 | 0.13 |
| 23 | 3.93 | 0.13 |
| 5 | 4.05 | 0.11 |
| 10 | 4.08 | 0.11 |
| 15 | 4.11 | 0.12 |
| 20 | 4.04 | 0.11 |

LUMINANCE SUMMARY

| | 5FC | AC |
|---|---|---|
| "E" | | |
| AVG. | 0.89 | 17.03 |
| MAX. | 0.93 | 19.43 |
| MIN. | 0.85 | 14.64 |
| SUM | 7.14 | 136.26 |
| "X" | | |
| AVG. | 0.89 | 16.36 |
| MAX. | 0.93 | 18.25 |
| MIN. | 0.83 | 14.08 |
| SUM | 4.44 | 81.80 |
| "T" | | |
| AVG. | 0.86 | 16.88 |
| MAX. | 0.90 | 18.29 |
| MIN. | 0.79 | 15.29 |
| SUM | 2.58 | 50.63 |
| "T" | | |
| AVG. | 0.80 | 16.63 |
| MAX. | 0.85 | 19.02 |
| MIN. | 0.73 | 15.30 |
| SUM | 3.20 | 66.50 |
| LETTERS | | |
| AVG. | 0.87 | 16.76 |
| MAX. | 0.93 | 19.43 |
| MIN. | 0.73 | 14.08 |
| Contrast Sum | 17.36 | 335.19 |
| Contrast Avg. | 0.87 | 16.76 |

TABLE 1-continued

|  | | |
|---|---|---|
| M/M BACKGROUND | 1.27 | 1.38 |
| AVG. | 3.97 | 0.14 |
| MAX. | 4.33 | 0.19 |
| MIN. | 3.54 | 0.11 |
| Contrast Sum | 91.42 | 3.27 |
| Contrast Avg. | 3.97 | 0.14 |
| C1 | 0.78 | 0.99 |

TABLE 2

LUMINANCE DATA

EXIT: LQMSW1G 120/277
HOUSING: WHITE
PANEL: GREEN MOLDED PANEL EHHPC50031
FACES: 1
LAMP #: (50) BLUE LEDs NICHIA NCPB510

|  | 5FC | AC |
|---|---|---|
| Letter "E" | | |
| 1 | 0.89 | 3.05 |
| 2 | 0.94 | 3.20 |
| 3 | 0.92 | 3.61 |
| 4 | 0.90 | 4.22 |
| 5 | 0.87 | 5.34 |
| 6 | 0.90 | 2.92 |
| 7 | 0.87 | 3.69 |
| 8 | 0.86 | 3.34 |
| Letter "X" | | |
| 9 | 0.90 | 2.74 |
| 10 | 0.89 | 3.50 |
| 11 | 0.86 | 5.08 |
| 12 | 0.87 | 2.86 |
| 13 | 0.88 | 5.05 |
| Letter "I" | | |
| 14 | 0.89 | 2.91 |
| 15 | 0.86 | 3.65 |
| 16 | 0.87 | 4.88 |
| Letter "T" | | |
| 17 | 0.90 | 3.06 |
| 18 | 0.80 | 3.20 |
| 19 | 0.82 | 3.80 |
| 20 | 0.84 | 4.51 |
| Background | | |
| 4 | 4.58 | 0.06 |
| 9 | 4.48 | 0.06 |
| 14 | 4.35 | 0.07 |
| 19 | 4.32 | 0.07 |
| 1 | 4.16 | 0.06 |
| 6 | 4.32 | 0.07 |
| 11 | 4.18 | 0.07 |
| 16 | 4.14 | 0.07 |
| 21 | 4.00 | 0.07 |
| 2 | 4.05 | 0.06 |
| 7 | 4.25 | 0.07 |
| 12 | 3.98 | 0.07 |
| 17 | 3.80 | 0.07 |
| 22 | 3.50 | 0.07 |
| 3 | 3.77 | 0.06 |
| 8 | 4.02 | 0.07 |
| 13 | 3.97 | 0.08 |
| 18 | 3.92 | 0.07 |
| 23 | 3.60 | 0.07 |
| 5 | 3.95 | 0.06 |
| 10 | 4.13 | 0.06 |
| 15 | 4.05 | 0.06 |
| 20 | 3.80 | 0.06 |

TABLE 2-continued

LUMINANCE SUMMARY

|  | 5FC | AC |
|---|---|---|
| "E" | | |
| AVG. | 0.89 | 3.92 |
| MAX. | 0.94 | 5.34 |
| MIN. | 0.86 | 2.92 |
| SUM | 7.15 | 31.37 |
| "X" | | |
| AVG. | 0.88 | 3.85 |
| MAX. | 0.90 | 5.08 |
| MIN. | 0.86 | 2.74 |
| SUM | 4.40 | 19.23 |
| "I" | | |
| AVG. | 0.87 | 3.81 |
| MAX. | 0.89 | 4.88 |
| MIN. | 0.86 | 2.91 |
| SUM | 2.62 | 11.44 |
| "T" | | |
| AVG. | 0.84 | 3.64 |
| MAX. | 0.90 | 4.51 |
| MIN. | 0.80 | 3.06 |
| LETTERS | | |
| AVG. | 0.88 | 3.83 |
| MAX. | 0.94 | 5.34 |
| MIN. | 0.80 | 2.74 |
| Contrast Sum | 17.53 | 76.61 |
| Contrast Avg. | 0.88 | 3.83 |
| M/M | 1.18 | 1.95 |
| BACKGROUND | | |
| AVG. | 4.06 | 0.07 |
| MAX. | 4.58 | 0.08 |
| MIN. | 3.50 | 0.06 |
| Contrast Sum | 93.32 | 1.53 |
| Contrast Avg | 4.06 | 0.07 |
| C1 | 0.78 | 0.98 |

TABLE 3

LUMINANCE DATA

EXIT: LQMSW1G 120/277
HOUSING: WHITE
PANEL: GREEN V-Glo PANEL
FACES: 1
LAMP #: (80) LEDs ON 2 BOARD'S (40 EACH) EMEDA00025

|  | 5FC | AC |
|---|---|---|
| Letter "E" | | |
| 1 | 0.85 | 1.49 |
| 2 | 0.89 | 2.12 |
| 3 | 0.92 | 2.43 |
| 4 | 0.90 | 2.35 |
| 5 | 0.90 | 1.48 |
| 6 | 0.87 | 1.53 |
| 7 | 0.93 | 2.23 |
| 8 | 0.88 | 1.62 |
| Letter "X" | | |
| 9 | 0.84 | 1.62 |
| 10 | 0.93 | 2.38 |
| 11 | 0.92 | 1.93 |
| 12 | 0.83 | 1.56 |
| 13 | 0.92 | 1.86 |
| Letter "I" | | |
| 14 | 0.79 | 1.50 |

TABLE 3-continued

| | | |
|---|---|---|
| 15 | 0.89 | 2.24 |
| 16 | 0.90 | 1.79 |
| Letter "T" | | |
| 17 | 0.78 | 1.38 |
| 18 | 0.73 | 2.01 |
| 19 | 0.84 | 2.50 |
| 20 | 0.85 | 1.91 |
| Background | | |
| 4 | 4.33 | 0.01 |
| 9 | 3.95 | 0.02 |
| 14 | 3.69 | 0.02 |
| 19 | 3.62 | 0.02 |
| 1 | 4.27 | 0.02 |
| 6 | 4.09 | 0.02 |
| 11 | 3.72 | 0.02 |
| 16 | 3.61 | 0.03 |
| 21 | 3.54 | 0.02 |
| 2 | 4.23 | 0.02 |
| 7 | 4.14 | 0.02 |
| 12 | 3.91 | 0.02 |
| 17 | 3.87 | 0.02 |
| 22 | 3.76 | 0.02 |
| 3 | 4.04 | 0.02 |
| 8 | 4.15 | 0.03 |
| 13 | 4.12 | 0.03 |
| 18 | 4.17 | 0.02 |
| 23 | 3.93 | 0.02 |
| 5 | 4.05 | 0.02 |
| 10 | 4.08 | 0.02 |
| 15 | 4.11 | 0.01 |
| 20 | 4.04 | 0.02 |

LUMINANCE SUMMARY

| | 5FC | AC |
|---|---|---|
| "E" | | |
| AVG. | 0.89 | 1.91 |
| MAX. | 0.93 | 2.43 |
| MIN. | 0.85 | 1.48 |
| SUM | 7.14 | 15.25 |
| "X" | | |
| AVG. | 0.89 | 1.87 |
| MAX. | 0.93 | 2.38 |
| MIN. | 0.83 | 1.56 |
| SUM | 4.44 | 9.35 |
| "I" | | |
| AVG. | 0.86 | 1.84 |
| MAX. | 0.90 | 2.24 |
| MIN. | 0.79 | 1.50 |
| SUM | 2.58 | 5.53 |
| "T" | | |
| AVG. | 0.80 | 1.95 |
| MAX. | 0.85 | 2.50 |
| MIN. | 0.73 | 1.38 |
| SUM | 3.20 | 7.80 |
| LETTERS | | |
| AVG. | 0.87 | 1.90 |
| MAX. | 0.93 | 2.50 |
| MIN. | 0.73 | 1.38 |
| Contrast Sum | 17.36 | 37.93 |
| Contrast Avg. | 0.87 | 1.90 |
| M/M | 1.27 | 1.81 |
| BACKGROUND | | |
| AVG. | 3.97 | 0.02 |
| MAX. | 4.33 | 0.03 |
| MIN. | 3.54 | 0.01 |
| Contrast Sum | 91.42 | 0.47 |
| Contrast Avg. | 3.97 | 0.02 |
| C1 | 0.78 | 0.99 |

TABLE 4

LUMINANCE DATA

EXIT: LQMSW1G 120/277
HOUSING: WHITE
PANEL: GREEN MOLDED PANEL EHHPC50031
FACES: 1
LAMP #: (80) LEDs ON 2 BOARD'S (40 EACH) EMEDA00025

| | 5FC | AC |
|---|---|---|
| Letter "E" | | |
| 1 | 0.89 | 1.71 |
| 2 | 0.94 | 2.53 |
| 3 | 0.92 | 2.81 |
| 4 | 0.90 | 2.78 |
| 5 | 0.87 | 1.60 |
| 6 | 0.90 | 1.83 |
| 7 | 0.87 | 2.78 |
| 8 | 0.86 | 1.76 |
| Letter "X" | | |
| 9 | 0.90 | 1.71 |
| 10 | 0.89 | 2.93 |
| 11 | 0.86 | 2.00 |
| 12 | 0.87 | 1.62 |
| 13 | 0.88 | 2.02 |
| Letter "I" | | |
| 14 | 0.89 | 1.55 |
| 15 | 0.86 | 2.60 |
| 16 | 0.87 | 2.06 |
| Letter "T" | | |
| 17 | 0.90 | 1.51 |
| 18 | 0.80 | 3.32 |
| 19 | 0.82 | 2.86 |
| 20 | 0.84 | 2.32 |
| Background | | |
| 4 | 4.58 | 0.03 |
| 9 | 4.48 | 0.03 |
| 14 | 4.35 | 0.03 |
| 19 | 4.32 | 0.02 |
| 1 | 4.16 | 0.03 |
| 6 | 4.32 | 0.03 |
| 11 | 4.18 | 0.03 |
| 16 | 4.14 | 0.03 |
| 21 | 4.00 | 0.03 |
| 2 | 4.05 | 0.02 |
| 7 | 4.25 | 0.02 |
| 12 | 3.98 | 0.02 |
| 17 | 3.80 | 0.03 |
| 22 | 3.50 | 0.02 |
| 3 | 3.77 | 0.02 |
| 8 | 4.02 | 0.02 |
| 13 | 3.97 | 0.03 |
| 18 | 3.92 | 0.02 |
| 23 | 3.60 | 0.03 |
| 5 | 3.95 | 0.02 |
| 10 | 4.13 | 0.02 |
| 15 | 4.05 | 0.02 |
| 20 | 3.80 | 0.02 |

LUMINANCE SUMMARY

| | 5FC | AC |
|---|---|---|
| "E" | | |
| AVG. | 0.89 | 2.23 |
| MAX. | 0.94 | 2.81 |
| MIN. | 0.86 | 1.60 |
| SUM | 7.15 | 17.80 |
| "X" | | |
| AVG. | 0.88 | 2.06 |
| MAX. | 0.90 | 2.93 |
| MIN. | 0.86 | 1.62 |

TABLE 4-continued

|  | | |
|---|---|---|
| SUM "T" | 4.40 | 10.28 |
| AVG. | 0.87 | 2.07 |
| MAX. | 0.89 | 2.60 |
| MIN. | 0.86 | 1.55 |
| SUM "T" | 2.62 | 6.21 |
| AVG. | 0.84 | 2.50 |
| MAX. | 0.90 | 3.32 |
| MIN. | 0.80 | 1.51 |
| SUM LETTERS | 3.36 | 10.01 |
| AVG. | 0.88 | 2.22 |
| MAX. | 0.94 | 3.32 |
| MIN. | 0.80 | 1.51 |
| Contrast Sum | 17.53 | 44.30 |
| Contrast Avg. | 0.88 | 2.22 |
| M/M | 1.18 | 2.20 |
| BACKGROUND | | |
| AVG. | 4.06 | 0.02 |
| MAX. | 4.58 | 0.03 |
| MIN. | 3.50 | 0.02 |
| Contrast Sum | 93.32 | 0.57 |
| Contrast Avg. | 4.06 | 0.02 |
| C1 | 0.78 | 0.99 |

The tables show average letter (indicium) luminance for the blue LED/green V-Glo panel (16.76) exceeding that for green LED/green V-Glo panel (1.90) by approximately 8.82 times. The effect of the V-Glo panel can be appreciated by comparing the average letter luminance for blue LEDs with green V-Glo panel (again, 16.76) against a plain green panel (3.83), approximately a 4.38-fold increase in luminance.

Figure 7:
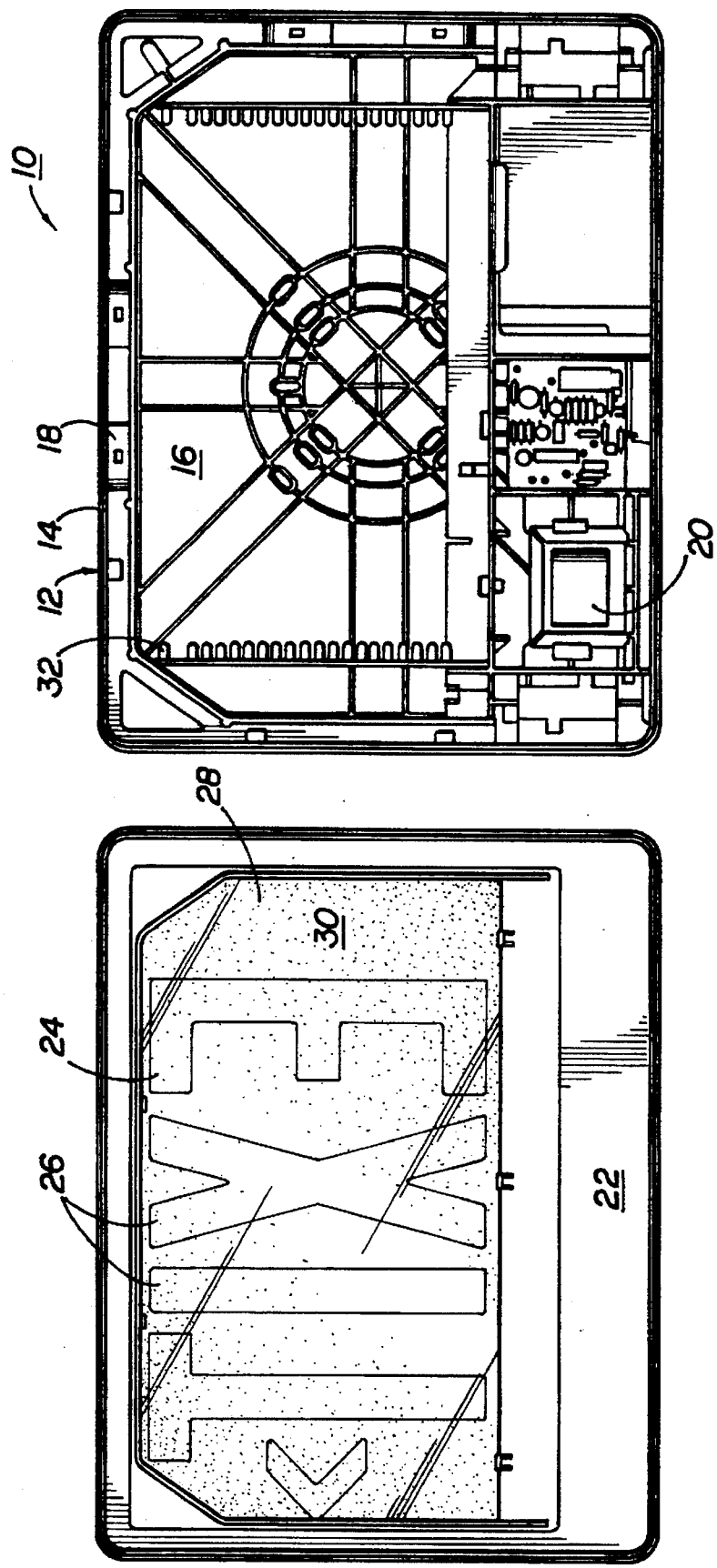
FIG. 7 is an exploded view showing the front and back assemblies of one lighting fixture which employs blue LEDs according to the present invention.

FIG. 7 shows a first version of a fixture 10 according to the present invention. Fixture 10 includes a housing 12 which contains a peripheral portion 14 and a back plane 16 formed in conventional fashion. Fittings 18 are provided for accommodating a conventional canopy for supporting the fixture and connecting to supporting structure. A power supply 20 of conventional design may contain a battery backup. A faceplate 22 connects to the peripheral portion 14 of housing, or housing 12, in conventional fashion and contains a stencil 24 which forms in cutout fashion, at least one indicium (in this case, the letters for the word "EXIT" and directional arrows or chevrons as selected). Indicia are shown using numeral 26. A screen 28 is disposed adjacent to the stencil 24 and the indicia 26, which screen 28 is formed in conventional fashion of green plastic translucent material. In the preferred embodiment, the screen is formed of 0.01 inch thick, UL94 listed General Electric Lexan flame retardant film, no. FR60-112 to which is applied the transformation material mentioned above as follows. A first surface is applied as a clear overprint with Plastic Plus 240330 clear inhibitor supplied by the Naz-Dar/KC company mentioned above, as PP series (one coat). The second surface is applied as one coat of GV590 V-Glo green as described above, and from the same supplier, using 179 mesh and 60 durometer squeegee. Other transformation material may be employed, so long as it has the property of reradiating, emitting, or reemitting light at a second band of wavelengths upon receipt of light in a first band of wavelength. The transformation material may be applied to any components of the lighting fixtures, including, without limitation, screens 28, indicia 24, and other components in any desired manner or may, if desired be included during formulation of the material forming such components. Transformation material is shown as numeral 30 in FIG. 7.

FIG. 7 also shows two banks of blue LEDs 32 as mentioned above mounted so as to emit light substantially orthogonally to the direction in which the indicia 26 are facing. The interior portions of fixture 10 may contain reflective material for increased efficiency as desired. Blue LEDs 32 emit light which excites molecules in the transformation material. The blue light, with peak wavelength of substantially 450 nm, causes the transformation material 30 and green screen 28 to reemit or radiate light in the green portion of the spectrum. The light features increased brightness, and is found in that part of the spectrum to which the human eye is most sensitive as shown in FIG. 1.

Figure 8:
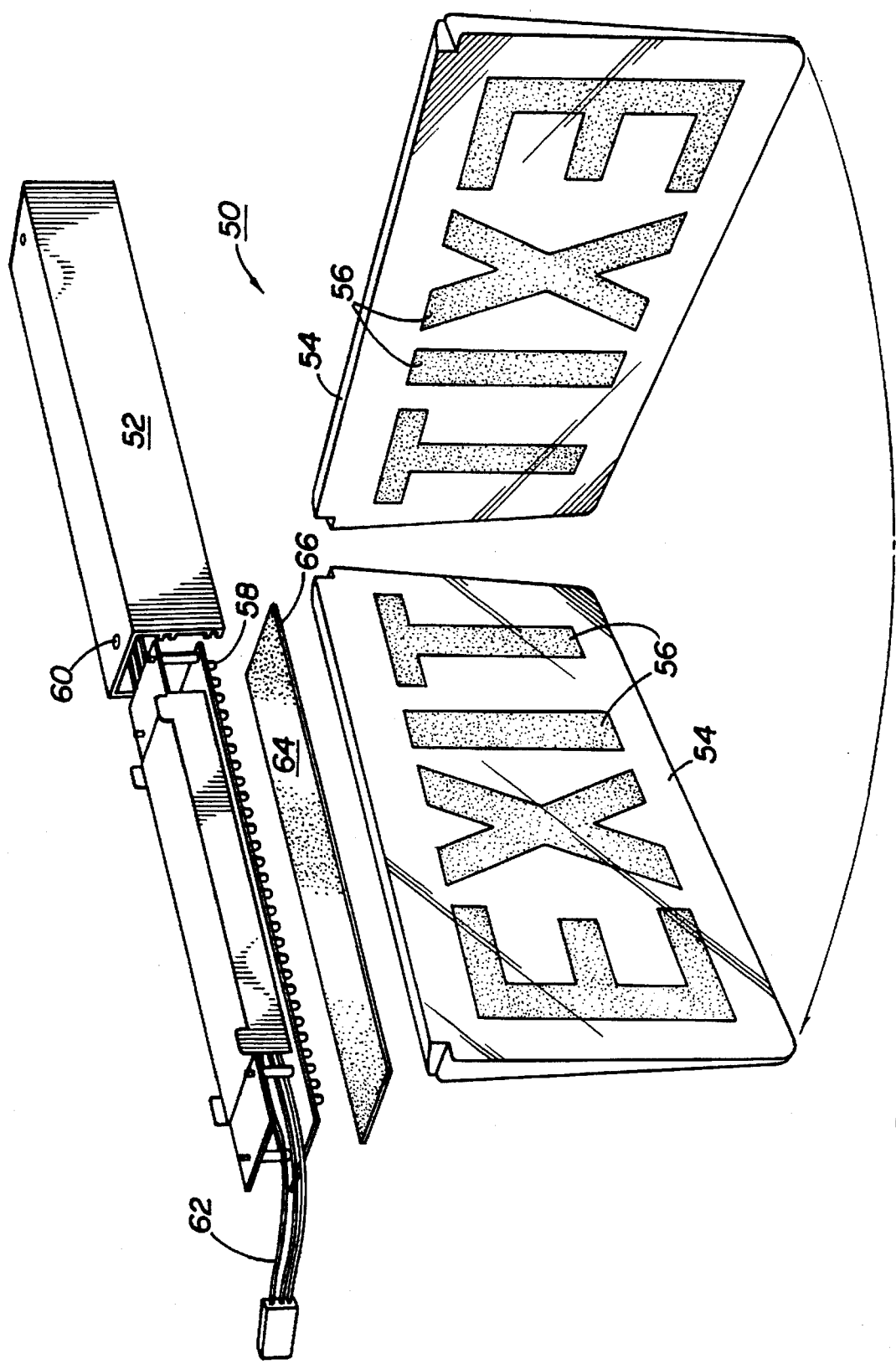
FIG. 8 is an exploded view of a second lighting fixture which employs blue LEDs according to the present invention.

FIG. 8 shows a second form of fixture 50 according to present the invention. Fixture 50 includes a housing 52 which may be formed of material such as extruded aluminum. A substantially clear panel 54 extends from housing 52 and contains indicia 56. At least one bank of blue LEDs 58 of the type mentioned above are positioned within housing 52, as on a mounting substructure 60, which fits in housing 52 and contains power supply capacity 62 as desired and required. Battery backup may also be supplied.

Indicia 56 may be formed of transformation material 64 or comprise green pigmented material laminated or coated with transformation material 64 as desired. Alternatively, indicia 56 may simply contain green pigmented material. Fixture 50 may also contain a green screen 66, formed as the screen of FIG. 7 is or otherwise, and coated in the same or similar fashion with transformation material 64. The LEDs emit light directly into the screen 66 and substantially orthogonally to the direction in which indicia 56 are facing. Instead of using screen 66, the transformation material 64 and/or green pigment/paint may be applied directly to the panel 54, such as on the upper surface or edge of panel 54. Alternatively, if no transformation material 64 is used between the LED's and the indicia 56, the blue LEDs cause the indicia 56, when comprising transformation material 64, to emit light in the green portion of the spectrum with increased brightness. The green screen 66 has been found to eliminate blue effects in the clear panel without substantially diminishing the brightness of the light emitted by the indicia. The green screen 66 and/or transformation material coated upper surface of panel 54 may be used with or without indicia 56 that comprises transformation material 64, such as with indicia 56 that comprises only green pigmented material.

The same transformation principles may apply in other portions of the spectrum. More specifically, it may be the case that combinations of transformation materials which emit light in the red (or other) portion of the spectrum, for instance, may be combined with LEDs which emit light in the orange, amber or white portions of the spectrum (and thus of shorter or different wavelength) to achieve the effect of the present invention resulting in lighting fixtures featuring indicia that are brighter than is conventionally the case. Just as evidently, green transformation material according to the present invention, such as that mentioned above, may be used with blue LEDs in a host of lighting fixture structures and applications for increased brightness and uniform illumination of indicia. Other variations, changes, modifications and departures from the structures and compositions disclosed above may be adopted without departure from the scope or spirit of the present invention which, in sum, employs in lighting fixtures excitation light in a first band of frequency and wavelength to excite transformation material that consequently reemits, reradiates, or emits light in a second band of frequency and wavelength (which bands may be partially or fully coextensive) with increased brightness.

What is claimed is:

1. A lighting fixture, comprising:
   a. a housing comprising structure for mounting to a supporting surface;
   b. a plurality of light emitting diodes contained within the housing, at least one of which is adapted to emit light energy of predominantly blue wavelengths;
   c. at least one indicium associated with the housing for imparting information, the indicium comprising transformation material which, upon receipt of and excitation by the light energy of predominantly blue wavelengths, emits light of predominantly green wavelenghts.

2. A lighting fixture according to claim 1 in which the housing comprises a frame which contains the light emitting diodes, and in which a substantially clear panel extends from the housing and includes the indicium formed at least partially from the transformation material, the indicium disposed so as to receive light from the light emitting diodes for reemission.

3. A lighting fixture according to claim 2 further comprising a screen comprising transformation material disposed between the light emitting diodes and the indicium.

4. A lighting fixture according to claim 3 in which:
   a. the screen defines a screen plane;
   b. the panel defines a panel plane; and
   c. the screen is disposed in the housing such that the screen plane is substantially perpendicular to the panel plane.

5. A lighting fixture according to claim 2 in which the light emitting diodes emit light featuring wavelengths of predominantly 420 to 470 nanometers.

6. A lighting fixture according to claim 2 in which the light emitting diodes emit light featuring peak wavelengths of substantially 430 to 450 nanometers.

7. A lighting fixture according to claim 2 in which the transformation material is adapted to radiate light featuring peak wavelengths of substantially 500 to 520 nanometers upon receipt of light featuring peak wavelengths of substantially 440 to 450 nanometers.

8. A lighting fixture according to claim 2 in which the transformation material is adapted to radiate light of substantially 500 to 520 nanometer peak wavelength upon receipt of substantially blue light.

9. A lighting fixture, comprising:
   a. a housing comprising structure for mounting to a supporting surface and a plurality of light emitting diodes adapted to emit light of predominantly 420 to 470 nanometer wavelength;
   b. a substantially clear panel extending from the housing and comprising at least one indicium for imparting information; and
   c. a screen comprising transformation material which, upon receipt of an excitation by the light of predominantly 420 to 470 nanometer wavelengths, emits light of predominantly 490 to 550 nanometer wavelengths, which screen is interposed in the housing between the light emitting diodes and the indicium.

10. A lighting fixture according to claim 9 in which the indicium comprises transformation material.

11. A lighting fixture according to claim 9 in which the light emitting diodes are adapted to emit light of substantially 430 to 450 nanometer peak wavelength, and the screen, upon receipt of such light, to radiate light of substantially 500 to 520 nanometer peak wavelength.

12. A lighting fixture according to claim 9 in which the light emitting diodes are positioned to emit light in a direction substantially parallel to a plane in which the indicium is disposed.

13. A lighting fixture which employs long life, low power lighting emitting diodes to illuminate indicia with maximum brightness and in wavelengths corresponding substantially to those to which the human eye is most sensitive, comprising:
   a. a housing comprising structure for connection to a supporting surface;
   b. at least one indicium associated with the housing, the indicium comprising transformation material which is adapted to emit light in wavelengths of predominantly 500 to 580 nanometers when excited by light of shorter wavelengths;
   c. a plurality of light emitting diodes adapted to emit light in a blue portion of a spectrum of wavelengths corresponding substantially to those to which the human eye is sensitive which, upon striking the transformation material, causes the transformation material to radiate light in a green portion of the spectrum.

14. A lighting fixture according to claim 13 in which the indicium comprises transformation material.

15. A lighting fixture according to claim 13 in which the light emitting diodes are adapted to emit light of substantially 430 to 450 nanometer peak wavelength and the transformation material is adapted to radiate light of substantially 500 to 520 nanometer peak wavelength upon receipt of such light.

16. A lighting fixture comprising:
   a. a housing;
   b. a light emitting diode contained within the housing that is adapted to emit predominantly blue light energy;
   c. an indicium for imparting information, which indicium is in light communication with the light emitting diode;
   d. a transformation material disposed between the light emitting diode and the indicium that, upon receiving and being excited by the predominantly blue light energy, emits predominantly green light energy.

17. A lighting fixture according to claim 16 further comprising a substantially clear panel extending from the housing on which panel the indicium is mounted.

18. A lighting fixture according to claim 17 in which the panel further comprises an edge disposed between the light emitting diode and the indicium and in which the transformation material is applied to the edge.

19. A lighting fixture according to claim 17 further comprising a screen disposed between the light emitting diode and the panel in which the transformation material is applied to the screen.

20. A lighting fixture according to claim 19 in which:
   a. the screen defines a screen plane;
   b. the panel defines a panel plane; and
   c. the screen is disposed in the housing such that the screen plane is substantially perpendicular to the panel plane.

* * * * *

UNITED STATES PATENT AND TRADEMARK OFFICE
CERTIFICATE OF CORRECTION

PATENT NO. : 5,640,792
DATED : June 24, 1997
INVENTOR(S) : Stephen T. Smith

It is certified that error appears in the above-indentified patent and that said Letters Patent is hereby corrected as shown below:

Column 2, line 39, insert "been" after have

Signed and Sealed this

Twenty-sixth Day of May, 1998

Attest:

BRUCE LEHMAN

*Attesting Officer*     *Commissioner of Patents and Trademarks*